(12) United States Patent
Hosomi

(10) Patent No.: US 12,379,007 B2
(45) Date of Patent: Aug. 5, 2025

(54) PAD AXLE AND BRAKE CALIPER

(71) Applicant: SHIMANO INC., Sakai (JP)

(72) Inventor: Yusuke Hosomi, Sakai (JP)

(73) Assignee: SHIMANO INC., Sakai (JP)

( * ) Notice: Subject to any disclaimer, the term of this patent is extended or adjusted under 35 U.S.C. 154(b) by 348 days.

(21) Appl. No.: 17/710,898

(22) Filed: Mar. 31, 2022

(65) Prior Publication Data

US 2023/0057181 A1 Feb. 23, 2023

Related U.S. Application Data

(63) Continuation-in-part of application No. 17/403,882, filed on Aug. 17, 2021, now abandoned.

(51) Int. Cl.
*F16D 65/18* (2006.01)
*F16D 65/00* (2006.01)
*F16D 66/00* (2006.01)

(52) U.S. Cl.
CPC ......... *F16D 65/0087* (2013.01); *F16D 65/18* (2013.01); *F16D 2066/001* (2013.01)

(58) Field of Classification Search
CPC ................ F16D 65/18; F16D 65/0087; F16D 55/55655; F16D 2055/007; F16D 55/22655; F16D 55/227; F16D 55/2265; B62L 1/005
USPC ......................................................... 188/26
See application file for complete search history.

(56) References Cited

U.S. PATENT DOCUMENTS

| | | | | |
|---|---|---|---|---|
| 3,396,824 A | * | 8/1968 | Meier | F16D 66/02 |
| | | | | 188/72.5 |
| 3,616,877 A | * | 11/1971 | Collins | F16D 55/2262 |
| | | | | 188/73.45 |
| 4,031,986 A | * | 6/1977 | Thompson | B60T 1/065 |
| | | | | 188/73.31 |
| 4,084,665 A | * | 4/1978 | Burnett | F16D 55/22655 |
| | | | | 188/73.45 |
| 4,362,350 A | * | 12/1982 | von Harz | H01R 13/426 |
| | | | | 439/744 |
| 4,382,491 A | * | 5/1983 | Chun | F16D 55/22655 |
| | | | | 188/196 P |
| 4,392,560 A | * | 7/1983 | Nakasu | F16D 65/0972 |
| | | | | 188/73.34 |

(Continued)

FOREIGN PATENT DOCUMENTS

| | | |
|---|---|---|
| CN | 104196928 | 12/2014 |
| CN | 105736589 | 7/2016 |

(Continued)

*Primary Examiner* — Thomas J Williams
(74) *Attorney, Agent, or Firm* — MORI & WARD, LLP

(57) ABSTRACT

A pad axle for a brake caliper comprises an axle body and a support body. The axle body includes a first mounting part and a second mounting part and extends along a longitudinal axis between the first mounting part and the second mounting part. Both of the first mounting part and the second mounting part are configured to be coupled to a caliper body of the brake caliper. The support body is a different member from the axle body and is attached to the axle body to movably support a brake pad of the brake caliper relative to the caliper body. The support body is provided between the first mounting part and the second mounting part of the axle body. The support body is made of a non-metallic material.

27 Claims, 11 Drawing Sheets

(56) References Cited

U.S. PATENT DOCUMENTS

| | | | |
|---|---|---|---|
| 6,061,912 A * | 5/2000 | Gazaway | B26B 13/24 |
| | | | 30/140 |
| 6,062,349 A | 5/2000 | Boisseau et al. | |
| 2013/0161134 A1 * | 6/2013 | Kobayashi | F16D 55/2265 |
| | | | 188/73.44 |
| 2014/0083805 A1 | 3/2014 | Hirotomi | |
| 2014/0116817 A1 | 5/2014 | Morais et al. | |
| 2016/0332693 A1 | 11/2016 | Kuo et al. | |
| 2018/0142742 A1 | 5/2018 | Kula et al. | |
| 2018/0290707 A1 * | 10/2018 | Nago | F16D 65/0056 |
| 2022/0170546 A1 * | 6/2022 | Nakai | B62L 1/005 |
| 2023/0057181 A1 * | 2/2023 | Hosomi | F16D 65/0087 |

FOREIGN PATENT DOCUMENTS

| | | |
|---|---|---|
| CN | 108071716 | 5/2018 |
| DE | 2458354 | 6/1975 |
| DE | 69804305 T2 | 9/2002 |
| DE | 20 2013 008 253 U1 | 10/2013 |
| FR | 2905155 | 2/2008 |
| GB | 1443544 | 7/1976 |
| JP | 2009-068593 | 4/2009 |

\* cited by examiner

PAD AXLE AND BRAKE CALIPER

CROSS-REFERENCE TO RELATED APPLICATIONS

The present application is a continuation-in-part application of the U.S. patent application Ser. No. 17/403,882 filed Aug. 17, 2021. The contents of this application are incorporated herein by reference in their entirety.

BACKGROUND OF THE INVENTION

Field of the Invention

The present invention relates to a pad axle and a brake caliper.

Discussion of the Background

A human-powered vehicle includes a brake device to apply braking force to a wheel. The brake device includes a brake pad and a pad pin. The pad pin movably supports the brake pad. A rattling noise is made between the brake pad and the pad pin due to vibration of the human-powered vehicle. On the other hand, the pad pin needs strength to support the brake pad.

SUMMARY OF THE INVENTION

In accordance with a first aspect of the present invention, a pad axle for a brake caliper comprises an axle body and a support body. The axle body includes a first mounting part and a second mounting part and extends along a longitudinal axis between the first mounting part and the second mounting part. Both of the first mounting part and the second mounting part are configured to be coupled to a caliper body of the brake caliper. The support body is a different member from the axle body and is attached to the axle body to movably support a brake pad of the brake caliper relative to the caliper body. The support body is provided between the first mounting part and the second mounting part of the axle body. The support body is made of a non-metallic material.

With the pad axle according to the first aspect, the support body made of the non-metallic material can reduce a rattling noise made between the pad axle and the brake pad due to vibration of the human-powered vehicle. Furthermore, since the support body is provided between the first mounting part and the second mounting part, the first mounting part and the second mounting part can maintain strength of the pad axle. Thus, it is possible to reduce the rattling noise while enabling the strength of the pad axle to be maintained.

In accordance with a second aspect of the present invention, the pad axle according to the first aspect is configured so that the support body includes a through-hole. The axle body is at least partially provided in the through-hole.

With the pad axle according to the second aspect, since the axle body is at least partially provided in the through-hole, it is possible to reliably maintain the strength of the pad axle.

In accordance with a third aspect of the present invention, a pad axle for a brake caliper comprises an axle body and a support body. The axle body is configured to be coupled to a caliper body of the brake caliper. The support body is attached to the axle body to movably support a brake pad of the brake caliper relative to the caliper body. The support body is made of a non-metallic material. The support body includes a through-hole. The axle body is at least partially provided in the through-hole.

With the pad axle according to the third aspect, the support body made of the non-metallic material can reduce a rattling noise made between the pad axle and the brake pad due to vibration of the human-powered vehicle. Furthermore, since the axle body is at least partially provided in the through-hole, it is possible to maintain the strength of the pad axle. Thus, it is possible to reduce the rattling noise while enabling the strength of the pad axle to be maintained.

In accordance with a fourth aspect of the present invention, the pad axle according to any one of the first to third aspects is configured so that the support body is made of a resin material.

With the pad axle according to the fourth aspect, the support body made of the resin material can effectively reduce the rattling noise.

In accordance with a fifth aspect of the present invention, the pad axle according to any one of the first to fourth aspects is configured so that the axle body is made of a metallic material.

With the pad axle according to the fifth aspect, the axle body made of the metallic material can reliably maintain the strength of the pad axle.

In accordance with a sixth aspect of the present invention, the pad axle according to any one of the first to fifth aspects is configured so that the support body includes a support outer surface contactable with the brake pad in a state where the support body movably supports the brake pad. The support outer surface is made of the non-metallic material.

With the pad axle according to the sixth aspect, the support outer surface made of the non-metallic material can effectively reduce the rattling noise.

In accordance with a seventh aspect of the present invention, the pad axle according to any one of the second to sixth aspects is configured so that the axle body includes a first axle body and a second axle body. The first axle body has a first outer diameter. The second axle body has a second outer diameter smaller than the first outer diameter. The second axle body is at least partially provided in the through-hole of the support body.

With the pad axle according to the seventh aspect, the support body can be attached to the axle body while enabling an outer diameter of the pad axle to be maintained.

In accordance with an eighth aspect of the present invention, the pad axle according to the seventh aspect is configured so that the axle body includes a third axle body having a third outer diameter. The second outer diameter is smaller than the first outer diameter and the third outer diameter. The second axle body is provided between the first axle body and the third axle body to define an attachment recess between the first axle body and the third axle body. The support body is at least partially provided in the attachment recess.

With the pad axle according to the eighth aspect, the support body can be attached to the axle body while enabling the outer diameter of the pad axle to be reliably maintained.

In accordance with a ninth aspect of the present invention, the pad axle according to the eighth aspect is configured so that the first outer diameter is larger than the third outer diameter.

With the pad axle according to the ninth aspect, it is possible to reliably maintain the strength of the pad axle.

In accordance with a tenth aspect of the present invention, the pad axle according to the eighth or ninth aspect is configured so that the support body has a support outer diameter larger than the second outer diameter.

With the pad axle according to the tenth aspect, it is possible to reliably maintain strength of the support body.

In accordance with an eleventh aspect of the present invention, the pad axle according to the tenth aspect is configured so that the support outer diameter is smaller than the first outer diameter.

With the pad axle according to the eleventh aspect, the support body can be attached to the axle body while enabling the outer diameter of the pad axle to be reliably maintained.

In accordance with a twelfth aspect of the present invention, the pad axle according to the tenth or eleventh aspect is configured so that the support outer diameter is equal to the third outer diameter.

With the pad axle according to the twelfth aspect, the support body can be attached to the axle body while enabling the outer diameter of the pad axle to be more reliably maintained.

In accordance with a thirteenth aspect of the present invention, the pad axle according to any one of the seventh to twelfth aspects is configured so that the first axle body includes a head part having a head outer diameter. The first outer diameter includes the head outer diameter. The head outer diameter is a maximum outer diameter in the pad axle.

With the pad axle according to the thirteenth aspect, the head part can restrict the pad axle from dropping off from the caliper body.

In accordance with a fourteenth aspect of the present invention, the pad axle according to the thirteenth aspect is configured so that the first axle body includes an axle part having an axle outer diameter. The first outer diameter includes the axle outer diameter. The axle outer diameter is smaller than the head outer diameter.

With the pad axle according to the fourteenth aspect, it is possible to effectively maintain the strength of the pad axle.

In accordance with a fifteenth aspect of the present invention, the pad axle according to the fourteenth aspect is configured so that the axle part includes an external thread coupled to an internal thread of the caliper body.

With the pad axle according to the fifteenth aspect, it is possible to reliably couple the pad axle to the caliper body via the external thread and the internal thread.

In accordance with a sixteenth aspect of the present invention, the pad axle according to any one of the seventh to fifteenth aspects is configured so that the support body includes a support outer surface and a slit extending radially outwardly from the through-hole to the support outer surface.

With the pad axle according to the sixteenth aspect, the slit can make easily the support body attachable to and/or detachable from the axle body.

In accordance with a seventeenth aspect of the present invention, the pad axle according to the sixteenth aspect is configured so that the support body is deformable to allow the axle body to pass from the support outer surface to the through-hole through the slit when the support body is attached to the axle body.

With the pad axle according to the seventeenth aspect, the slit can reliably make the support body attachable to the axle body.

In accordance with an eighteenth aspect of the present invention, the pad axle according to the sixteenth or seventeenth aspect is configured so that the support body is deformable to allow the axle body to pass from the through-hole to the support outer surface through the slit when the support body is detached from the axle body.

With the pad axle according to the eighteenth aspect, the slit can reliably make the support body detachable from the axle body.

In accordance with a nineteenth aspect of the present invention, the pad axle according to the sixteenth to eighteenth aspect is configured so that the support body includes a first circumferential end and a second circumferential end. The second circumferential end is spaced apart from the first circumferential end to define the slit between the first circumferential end and the second circumferential end. The slit has a width defined between the first circumferential end and the second circumferential end. The width of the slit is smaller than the second outer diameter of the second axle body in an attachment state where the support body is attached to the axle body.

With the pad axle according to the nineteenth aspect, it is possible to maintain a state where the support body is attached to the axle body.

In accordance with a twentieth aspect of the present invention, the pad axle according to any one of the seventh to nineteenth aspects is configured so that the axle body includes a third axle body having a third outer diameter. The support body is made of a heat-shrinkable material. The support body has an inner diameter. The inner diameter of the support body is larger than the third outer diameter before heat shrinkage of the support body.

With the pad axle according to the twentieth aspect, it is possible to insert the axle body into the support body before heat shrinkage of the support body since the inner diameter of the support body is larger than the third outer diameter before heat shrinkage of the support body. This makes it easier to assemble the axle body and the support body.

In accordance with a twenty-first aspect of the present invention, the pad axle according to the twentieth aspect is configured so that the inner diameter of the support body is smaller than the third outer diameter after heat shrinkage of the support body.

With the pad axle according to the twenty-first aspect, it is possible to reliably fasten the support body to the axle body using heat shrinkage of the support body.

In accordance with a twenty-second aspect of the present invention, the pad axle according to the twentieth or twenty-first aspect is configured so that the support body has a support outer diameter. The support outer diameter is different from the third outer diameter after heat shrinkage of the support body.

With the pad axle according to the twenty-second aspect, it is possible to enlarge a range of size tolerance of the support outer diameter after heat shrinkage of the support body. This improves productivity of the pad axle.

In accordance with a twenty-third aspect of the present invention, the pad axle according to any one of the first to twenty-second aspects is configured so that the support body is made of a heat-shrinkable material.

With the pad axle according to the twenty-third aspect, the heat-shrinkable material enables the axle body and the support body to be more easily assembled and/or to be reliably fastened to each other.

In accordance with a twenty-fourth aspect of the present invention, the pad axle according to any one of the first to twenty-third aspects is configured so that the axle body includes a first axle end and a second axle end and extends along the longitudinal axis between the first axle end and the second axle end. The support body is provided between the first axle end and the second axle end.

With the pad axle according to the twenty-fourth aspect, it is possible to provide an enough length of the pad axle.

In accordance with a twenty-fifth aspect of the present invention, a brake caliper for a human-powered vehicle comprises a caliper body, a brake pad including a support hole, and the pad axle according to any one of the first to twenty-fourth aspects. The pad axle is coupled to the caliper body. The pad axle extends through the support hole to movably support the brake pad relative to the caliper body.

With the brake caliper according to the twenty-fifth aspect, it is possible to apply the structure of the pad axle to the brake caliper. Thus, it is possible to reduce the rattling noise while enabling the strength of the pad axle to be maintained in the brake caliper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
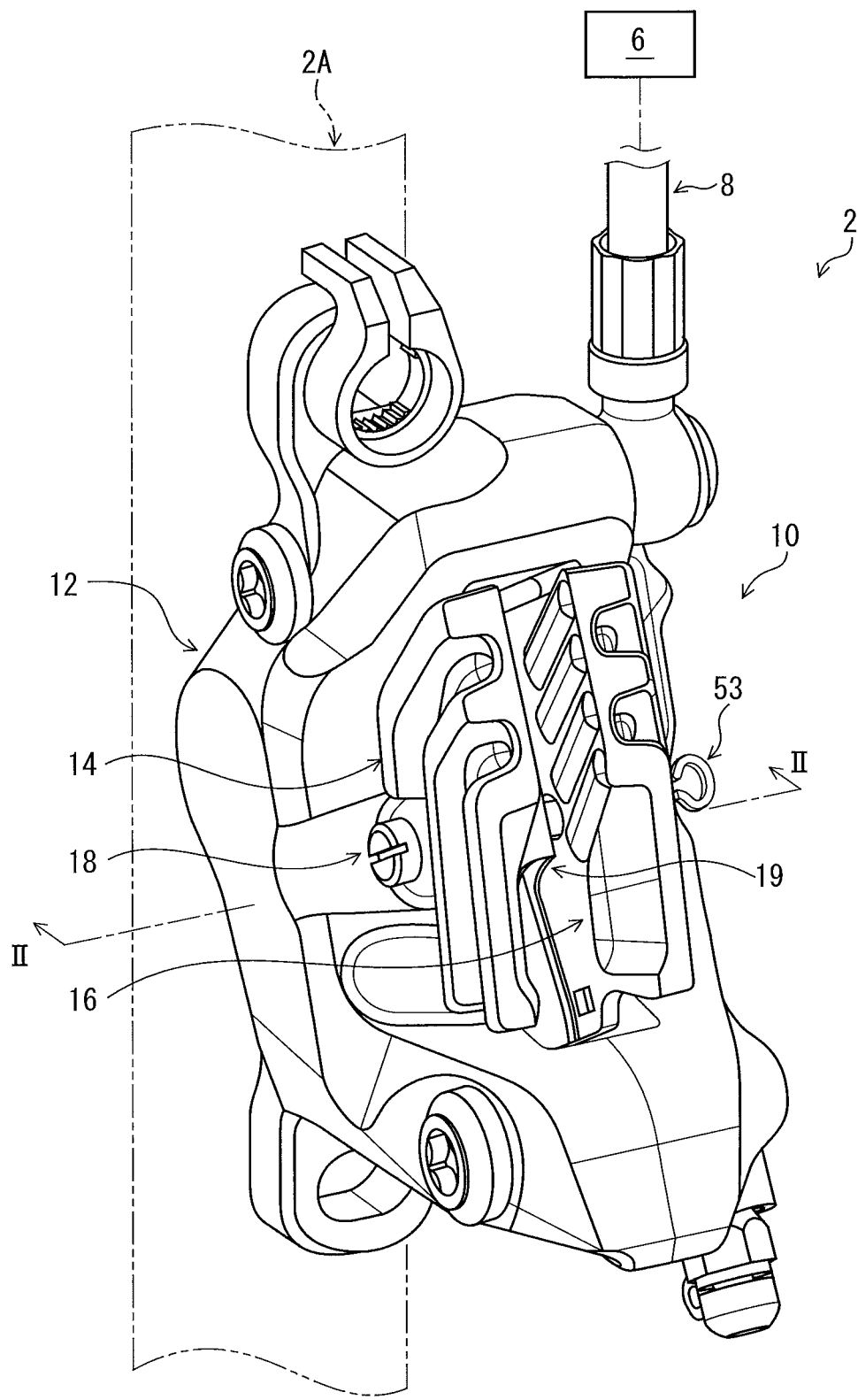
FIG. 1 is a perspective view of a brake caliper of a human-powered vehicle.

The embodiment(s) will now be described with reference to the accompanying drawings, wherein like reference numerals designate corresponding or identical elements throughout the various drawings.

Figure 2:
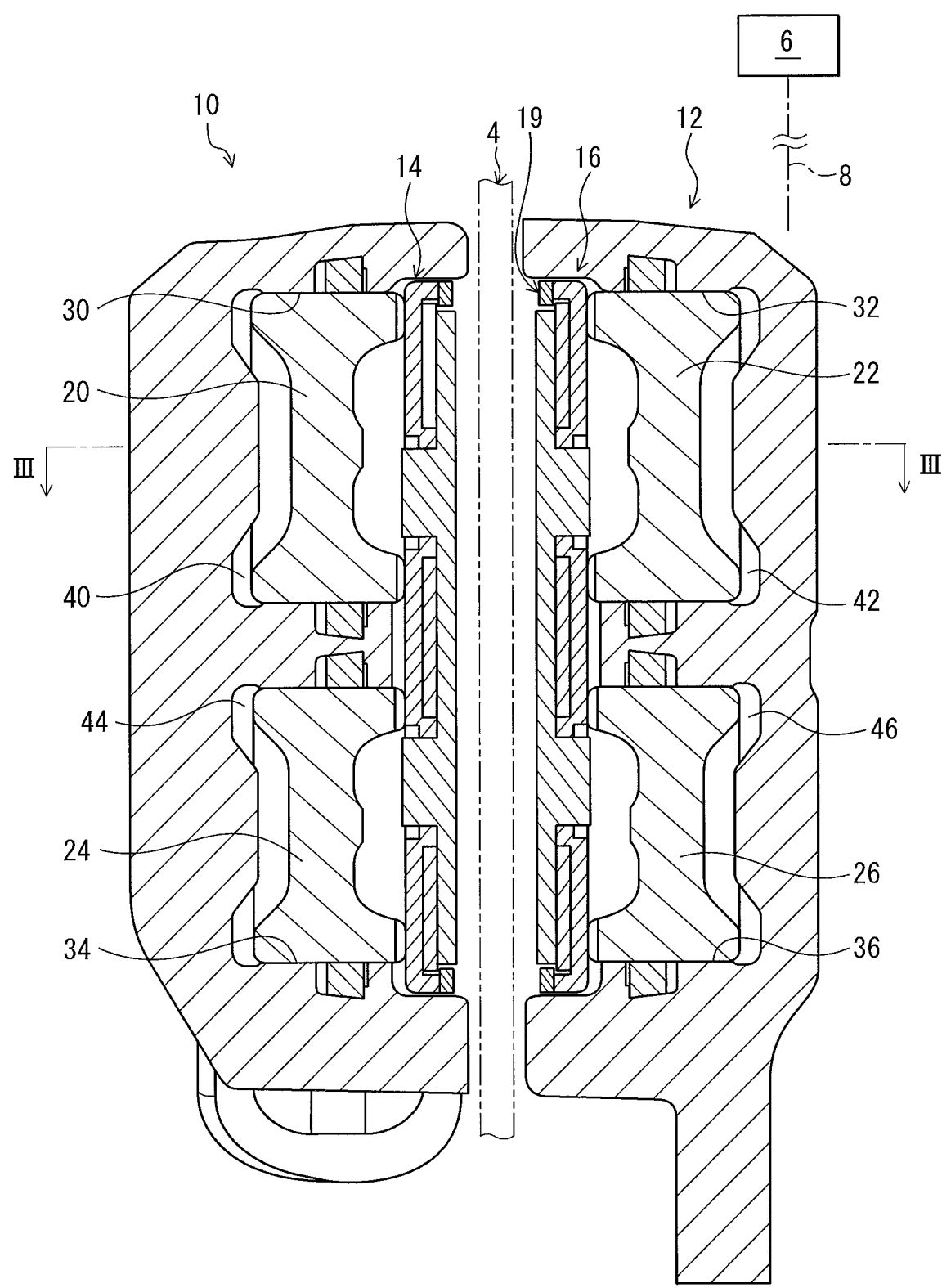
FIG. 2 is a cross-sectional view of the brake caliper taken along line II-II of FIG. 1.

As seen in FIG. 1, a brake caliper 10 for a human-powered vehicle 2 is configured to apply braking force to a disc brake rotor 4 (see e.g., FIG. 2). The brake caliper 10 is configured to be connected to an operating device 6 via a hydraulic hose 8. The brake caliper 10 is configured to apply braking force to the disc brake rotor 4 (see e.g., FIG. 2) in response to a hydraulic pressure generated by the operating device 6.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The brake caliper 10 for the human-powered vehicle 2 comprises a caliper body 12. The caliper body 12 is configured to be mounted to a vehicle body 2A of the human-powered vehicle 2.

The brake caliper 10 for the human-powered vehicle 2 comprises a brake pad 14. The brake pad 14 is configured to be movably coupled to the caliper body 12. The brake caliper 10 for the human-powered vehicle 2 comprises a brake pad 16. The brake pad 16 is configured to be movably coupled to the caliper body 12.

The brake caliper 10 for the human-powered vehicle 2 comprises a pad axle 18. The pad axle 18 is coupled to the caliper body 12. The pad axle 18 is configured to movably support the brake pad 14 relative to the caliper body 12. The pad axle 18 is configured to movably support the brake pad 16 relative to the caliper body 12.

The brake caliper 10 comprises a biasing member 19. The biasing member 19 is configured to bias the brake pads 14 away from each other. The pad axle 18 is configured to movably support the biasing member 19 relative to the caliper body 12.

As seen in FIG. 2, the brake caliper 10 includes a plurality of pistons 20, 22, 24, and 26. The caliper body 12 includes a plurality of recesses 30, 32, 34, and 36. The piston 20 is movably provided in the recess 30. The piston 22 is movably provided in the recess 32. The piston 24 is movably provided in the recess 34. The piston 26 is movably provided in the recess 36. However, a total number of the pistons is not limited to four. A total number of the recesses is not limited to four.

The caliper body 12 and the piston 20 define a hydraulic chamber 40 in the recess 30. The caliper body 12 and the piston 22 define a hydraulic chamber 42 in the recess 32. The caliper body 12 and the piston 24 define a hydraulic chamber 44 in the recess 34. The caliper body 12 and the piston 26 define a hydraulic chamber 46 in the recess 36. The hydraulic chambers 40, 42, 44, and 46 are configured to be connected to a master chamber of the operating device 6 via a communication passageway and the hydraulic hose 8.

The pistons 20, 22, 24, and 26 are configured to move the brake pad 14 toward the disc brake rotor 4 in response to a hydraulic pressure generated by the operating device 6. The pistons 20, 22, 24, and 26 are configured to move the brake pad 14 toward the disc brake rotor 4 in response to a hydraulic pressure generated by the operating device 6.

Figure 3:
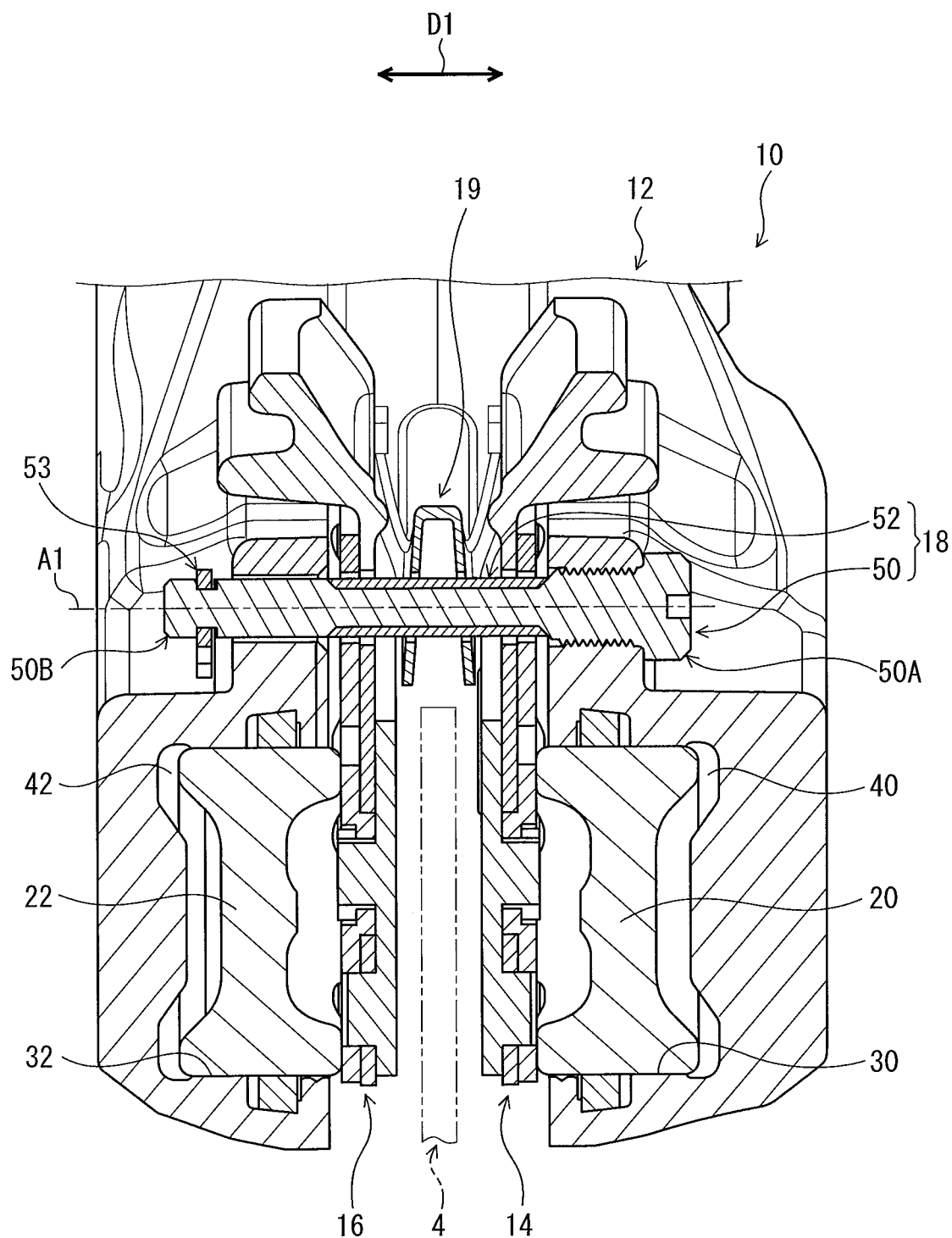
FIG. 3 is a cross-sectional view of the brake caliper taken along line III-III of FIG. 2.

As seen in FIG. 3, the pad axle 18 has a longitudinal axis A1 and extends along the longitudinal axis A1. The pad axle 18 for the brake caliper 10 comprises an axle body 50 and a support body 52. The axle body 50 is configured to be coupled to the caliper body 12 of the brake caliper 10. The support body 52 is a different member from the axle body 50. The support body 52 is a separate member from the axle body 50. The support body 52 is attached to the axle body 50. The support body 52 is detachably attached to the axle body 50. However, the support body 52 can be attached to the axle body 50 not to be detachable from the axle body 50 if needed and/or desired. For example, the support body 52 can be attached to the axle body 50 using an adhesive agent. The support body 52 can be attached to the axle body 50 using an insert molding.

Figure 4:
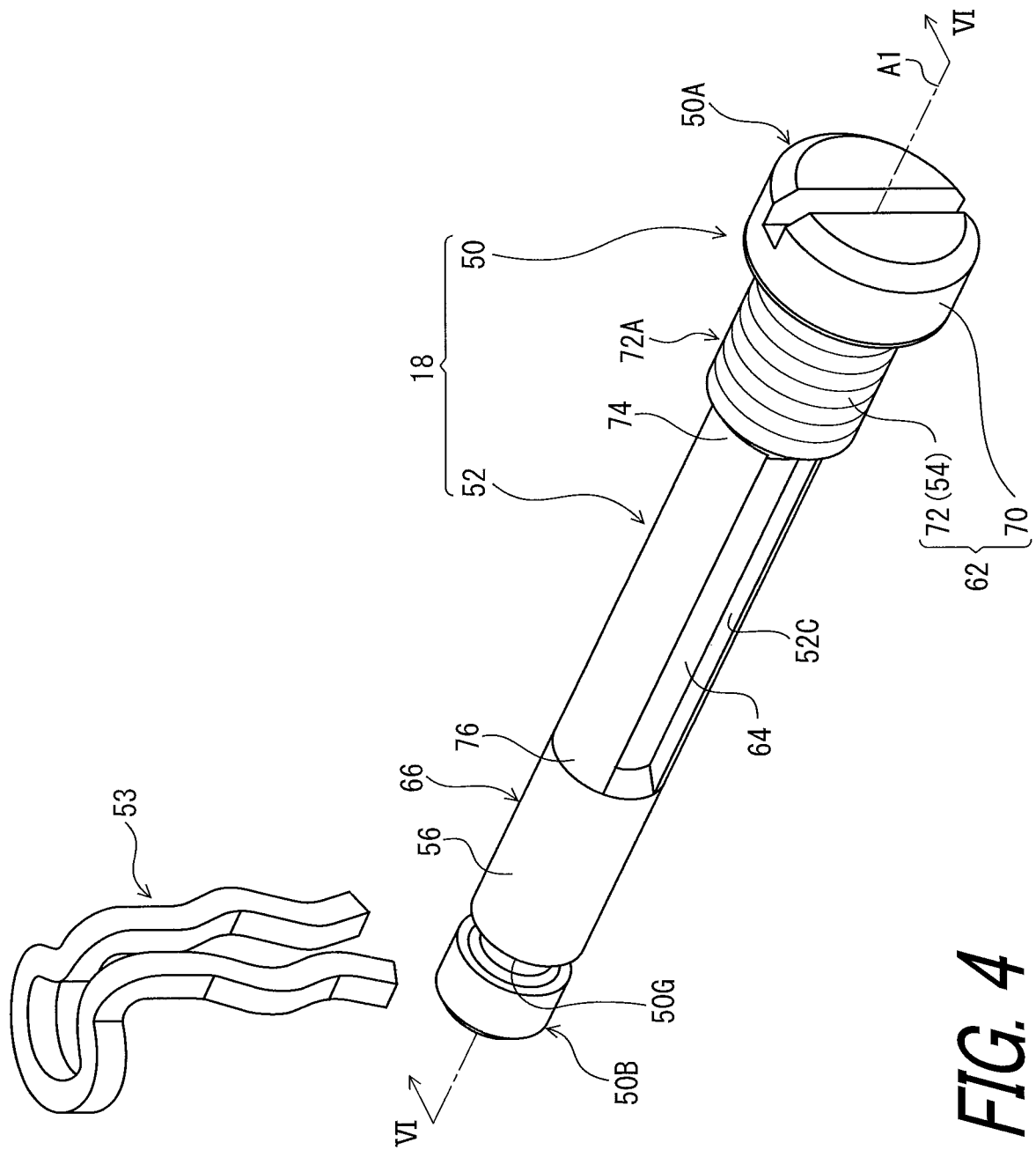
FIG. 4 is a perspective view of a pad axle and a retainer of the brake caliper illustrated in FIG. 1.

As seen in FIG. 4, the axle body 50 includes a first axle end 50A and a second axle end 50B. The axle body 50 extends along the longitudinal axis A1 between the first axle end 50A and the second axle end 50B. The first axle end 50A is spaced apart from the second axle end 50B in an axial direction D1 defined along the longitudinal axis A1. The support body 52 is provided between the first axle end 50A and the second axle end 50B. The support body 52 is provided between the first axle end 50A and the second axle end 50B in the axial direction D1.

The brake caliper 10 includes a retainer 53. The retainer 53 is configured to be detachably attached to the pad axle 18. The axle body 50 includes a groove 50G. The retainer 53 is configured to be provided in the groove 50G in a state where the retainer 53 is attached to the pad axle 18. The retainer 53 is configured to restrict the pad axle 18 from unintentionally dropping off from the caliper body 12.

The term "detachably attached," as used herein, encompasses a configuration in which an element is repeatedly detachable from and attachable to another element without substantial damage.

Figure 5:
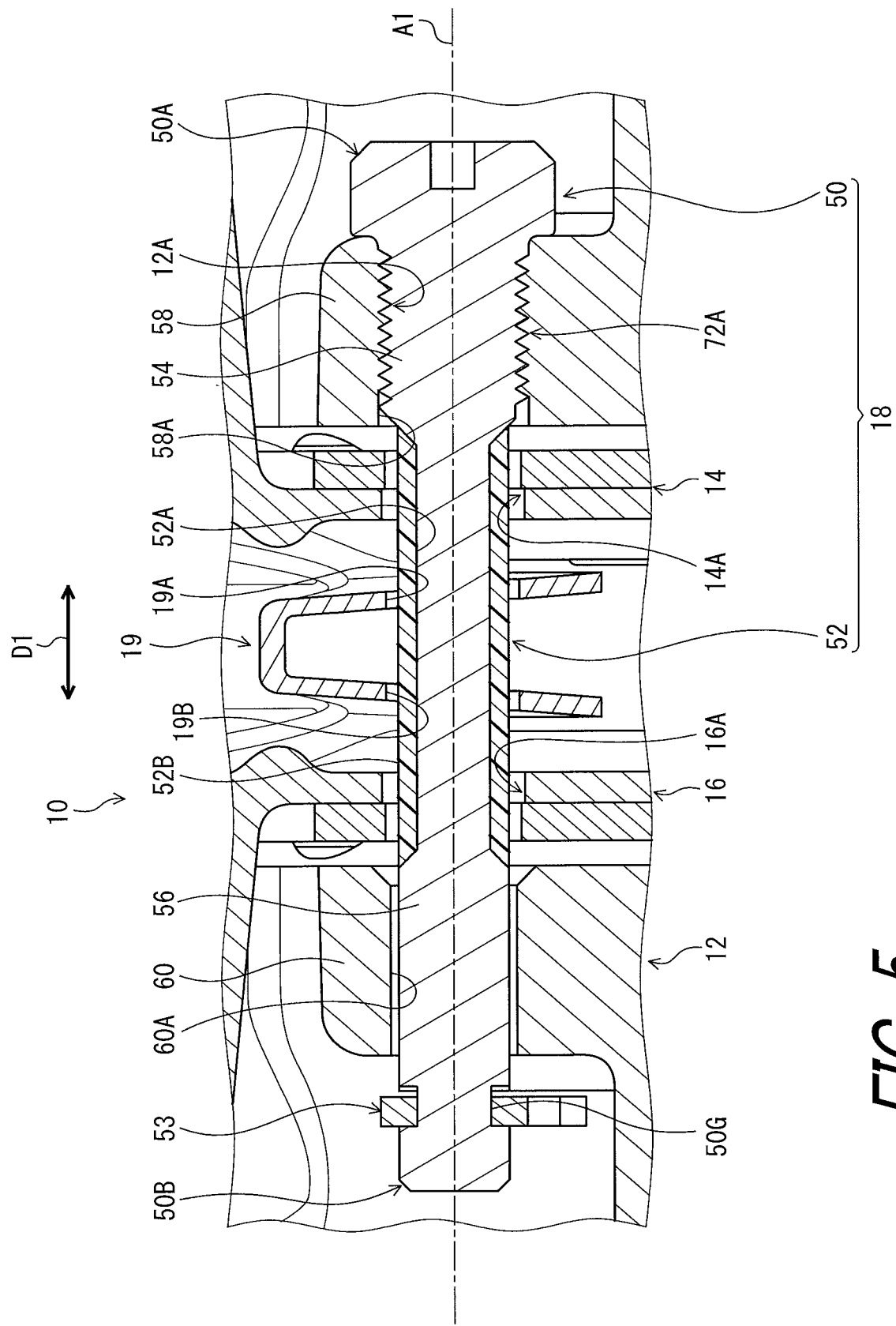
FIG. 5 is an enlarged partial cross-sectional view of the brake caliper illustrated in FIG. 3.

As seen in FIG. 5, the support body 52 is attached to the axle body 50 to movably support the brake pad 14 of the brake caliper 10 relative to the caliper body 12. The support body 52 is attached to the axle body 50 to movably support the brake pad 16 of the brake caliper 10 relative to the caliper body 12. The support body 52 is slidably contactable with the brake pads 14 and 16. The axle body 50 is not contactable with the brake pads 14 and 16.

The support body 52 is at least partially provided radially between the axle body 50 and the brake pad 14 with respect to the longitudinal axis A1 in a state where the pad axle 18 movably supports the brake pad 14. The support body 52 is at least partially provided radially between the axle body 50 and the brake pad 16 with respect to the longitudinal axis A1 in a state where the pad axle 18 movably supports the brake pad 16.

In the present embodiment, the support body 52 is partially provided radially between the axle body 50 and the brake pad 14 with respect to the longitudinal axis A1 in the state where the pad axle 18 movably supports the brake pad 14. The support body 52 is partially provided radially between the axle body 50 and the brake pad 16 with respect to the longitudinal axis A1 in the state where the pad axle 18 movably supports the brake pad 16. However, the support body 52 can be entirely provided radially between the axle body 50 and the brake pad 14 with respect to the longitudinal axis A1 in the state where the pad axle 18 movably supports the brake pad 14 if needed and/or desired. The support body 52 can be entirely provided radially between the axle body 50 and the brake pad 16 with respect to the longitudinal axis A1 in the state where the pad axle 18 movably supports the brake pad 16 if needed and/or desired.

The axle body 50 includes a first mounting part 54 and a second mounting part 56. The axle body 50 extends along the longitudinal axis A1 between the first mounting part 54 and the second mounting part 56. Both of the first mounting part 54 and the second mounting part 56 are configured to be coupled to the caliper body 12 of the brake caliper 10. The first mounting part 54 is spaced apart from the second mounting part 56 in the axial direction D1. The support body 52 is provided between the first mounting part 54 and the second mounting part 56 of the axle body 50. The support body 52 is provided between the first mounting part 54 and the second mounting part 56 in the axial direction D1. The support body 52 is attached to the axle body 50 to movably support the brake pad 14 of the brake caliper 10 relative to the caliper body 12 in the axial direction D1. The support body 52 is attached to the axle body 50 to movably support the brake pad 16 of the brake caliper 10 relative to the caliper body 12 in the axial direction D1.

The brake pad 14 includes a support hole 14A. The pad axle 18 extends through the support hole 14A to movably support the brake pad 14 relative to the caliper body 12. The support body 52 is at least partially provided in the support hole 14A in a state where the pad axle 18 movably supports the brake pad 14. In the present embodiment, the support body 52 is partially provided in the support hole 14A in a state where the pad axle 18 movably supports the brake pad 14. However, the support body 52 can be entirely provided in the support hole 14A in the state where the pad axle 18 movably supports the brake pad 14 if needed and/or desired.

The brake pad 16 includes a support hole 16A. The pad axle 18 extends through the support hole 16A to movably support the brake pad 16 relative to the caliper body 12. The support body 52 is at least partially provided in the support hole 16A in a state where the pad axle 18 movably supports the brake pad 16. In the present embodiment, the support body 52 is partially provided in the support hole 16A in a state where the pad axle 18 movably supports the brake pad 16. However, the support body 52 can be entirely provided in the support hole 16A in the state where the pad axle 18 movably supports the brake pad 16 if needed and/or desired.

The biasing member 19 includes a first support hole 19A and a second support hole 19B. The pad axle 18 extends through the first support hole 19A and the second support hole 19B to movably support the biasing member 19 relative to the caliper body 12. The support body 52 is at least partially provided in at least one of the first support hole 19A and the second support hole 19B in a state where the pad axle 18 movably supports the biasing member 19. In the present embodiment, the support body 52 is partially provided in each of the first support hole 19A and the second support hole 19B in the state where the pad axle 18 movably supports the biasing member 19. However, the support body 52 can be entirely provided in at least one of the first support hole 19A and the second support hole 19B in the state where the pad axle 18 movably supports the biasing member 19 if needed and/or desired.

The caliper body 12 includes a first axle support 58 and a second axle support 60. The first axle support 58 is spaced apart from the second axle support 60 in the axial direction D1. The support body 52 is provided between the first axle support 58 and the second axle support 60 in the axial direction D1. The brake pads 14 and 16 are provided between the first axle support 58 and the second axle support 60 in the axial direction D1. The biasing member 19 is provided between the first axle support 58 and the second axle support 60 in the axial direction D1.

The first mounting part 54 is configured to be coupled to the first axle support 58. The first mounting part 54 is contactable with the first axle support 58 in a state where the first mounting part 54 is coupled to the first axle support 58. The first axle support 58 includes a first hole 58A. The first mounting part 54 is at least partially provided in the first hole 58A in a state where the pad axle 18 is mounted to the caliper body 12. In the present embodiment, the first mounting part 54 is partially provided in the first hole 58A in the state where the pad axle 18 is mounted to the caliper body 12. However, the first mounting part 54 can be entirely provided in the first hole 58A in the state where the pad axle 18 is mounted to the caliper body 12 if needed and/or desired.

The second mounting part 56 is configured to be coupled to the second axle support 60. The second mounting part 56 is contactable with the second axle support 60 in a state where the second mounting part 56 is coupled to the second axle support 60. The second axle support 60 includes a second hole 60A. The second mounting part 56 is at least partially provided in the second hole 60A in a state where the pad axle 18 is mounted to the caliper body 12. In the present embodiment, the second mounting part 56 is partially provided in the second hole 60A in the state where the pad axle 18 is mounted to the caliper body 12. However, the second mounting part 56 can be entirely provided in the second hole 60A in the state where the pad axle 18 is mounted to the caliper body 12 if needed and/or desired.

The first mounting part 54 includes an external thread 72A. The first mounting part 54 includes external threads 72A. The caliper body 12 includes an internal thread 12A. The caliper body 12 includes internal threads 12A. The external thread 72A of the first mounting part 54 is coupled to the internal thread 12A of the caliper body 12. In the present embodiment, the first hole 58A includes the internal thread 12A. The second hole 60A is free of an internal thread. The external thread 72A can be omitted from the first mounting part 54 if needed and/or desired. The internal thread 12A can be omitted from the caliper body 12 if needed and/or desired.

Figure 6:
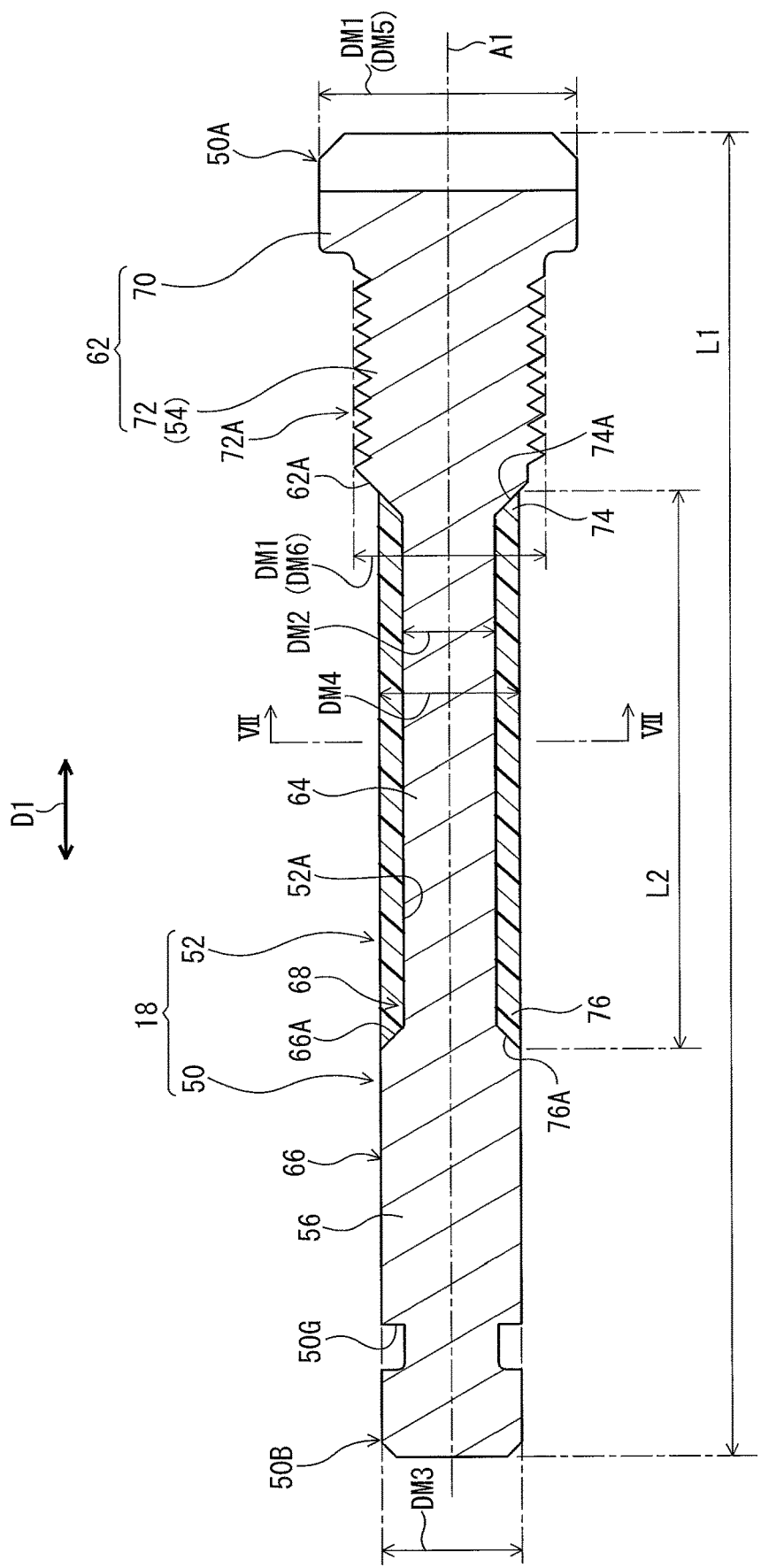
FIG. 6 is a cross-sectional view of the pad axle taken along line VI-VI of FIG. 4.

As seen in FIG. 6, the support body 52 includes a through-hole 52A. The through-hole 52A extends along the longitudinal axis A1. The axle body 50 is at least partially provided in the through-hole 52A. The first mounting part 54 is at least partially provided outside the through-hole 52A. The second mounting part 56 is at least partially provided outside the through-hole 52A.

In the present embodiment, the axle body 50 is partially provided in the through-hole 52A. The first mounting part 54 is entirely provided outside the through-hole 52A. The second mounting part 56 is entirely provided outside the through-hole 52A. However, the axle body 50 can be entirely provided in the through-hole 52A if needed and/or desired. The first mounting part 54 can be at least partially provided in the through-hole 52A if needed and/or desired. The second mounting part 56 can be at least partially provided in the through-hole 52A if needed and/or desired.

The axle body 50 is made of a metallic material such as aluminum, iron, or stainless steel. The support body 52 is made of a non-metallic material. The support body 52 is made of a resin material. The support body 52 is made of a high-temperature resin material such as phenolic resins. However, the support body 52 can be made of a non-metallic material other than a resin material.

The axle body 50 includes a first axle body 62 and a second axle body 64. The first axle body 62 includes the first mounting part 54. The first axle body 62 defines the first axle end 50A. The second axle body 64 defines the second axle end 50B. The first axle body 62 has a first outer diameter DM1. The second axle body 64 has a second outer diameter DM2 smaller than the first outer diameter DM1. The second axle body 64 is at least partially provided in the through-hole 52A of the support body 52. In the present embodiment, the second axle body 64 is entirely provided in the through-hole 52A of the support body 52. However, the second axle body 64 can be partially provided in the through-hole 52A of the support body 52 if needed and/or desired.

The axle body 50 includes a third axle body 66 having a third outer diameter DM3. The third axle body 66 includes the second mounting part 56 and the groove 50G. The first outer diameter DM1 is larger than the third outer diameter DM3. The second outer diameter DM2 is smaller than the first outer diameter DM1 and the third outer diameter DM3. The second axle body 64 is provided between the first axle body 62 and the third axle body 66 to define an attachment recess 68 between the first axle body 62 and the third axle body 66. The support body 52 is at least partially provided in the attachment recess 68. In the present embodiment, the support body 52 is entirely provided in the attachment recess 68. However, the support body 52 can be partially provided in the attachment recess 68 if needed and/or desired.

The support body 52 has a support outer diameter DM4 larger than the second outer diameter DM2. The support outer diameter DM4 is smaller than the first outer diameter DM1. The support outer diameter DM4 is equal to the third outer diameter DM3. However, the support outer diameter DM4 can be different from the third outer diameter DM3 if needed and/or desired. The support outer diameter DM4 can be equal to or larger than the first outer diameter DM1 if needed and/or desired.

The first axle body 62 includes a head part 70 having a head outer diameter DM5. The first outer diameter DM1 includes the head outer diameter DM5. The head outer diameter DM5 is a maximum outer diameter in the pad axle 18. The head outer diameter DM5 is larger than the second outer diameter DM2, the third outer diameter DM3, and the support outer diameter DM4. However, the head outer diameter DM5 can be equal to or smaller than at least one of the second outer diameter DM2, the third outer diameter DM3, and the support outer diameter DM4 if needed and/or desired. The head part 70 can be omitted from the first axle body 62 if needed and/or desired.

The first axle body 62 includes an axle part 72 having an axle outer diameter DM6. The first outer diameter DM1 includes the axle outer diameter DM6. The head part 70 extends radially outwardly from the axle part 72. The axle outer diameter DM6 is smaller than the head outer diameter DM5.

The axle part 72 corresponds to the first mounting part 54. The axle part 72 includes the external thread 72A. The external thread 72A is coupled to the internal thread 12A of the caliper body 12. The axle outer diameter DM6 is an external major diameter of the external threads 72A.

The axle body 50 has a first length L1 defined along the longitudinal axis A1. The support body 52 has a second length L2 defined along the longitudinal axis A1. The first length L1 is defined from the first axle end 50A to the second axle end 50B along the longitudinal axis A1. The first length L1 is longer than the second length L2.

The support body 52 includes a first end 74 and a second end 76. The support body 52 extends along the longitudinal axis A1 between the first end 74 and the second end 76. The second length L2 is defined from the first end 74 of the support body 52 to the second end 76 of the support body 52 along the longitudinal axis A1.

Figure 7:
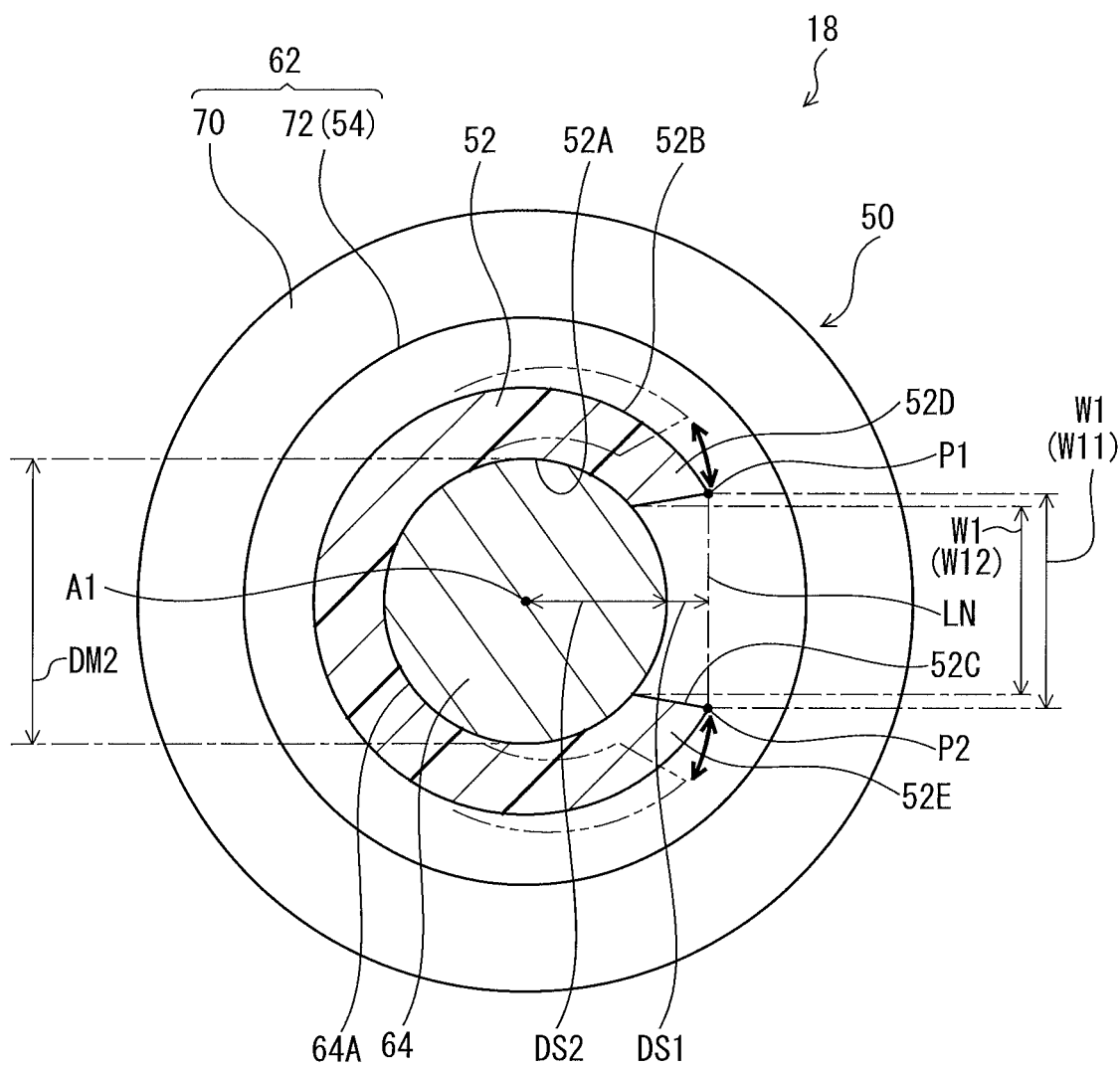
FIG. 7 is a cross-sectional view of the pad axle taken along line VII-VII of FIG. 6.

As seen in FIG. 7, the support body 52 includes a support outer surface 52B. As seen in FIG. 5, the support outer surface 52B is contactable with the brake pad 14 in a state where the support body 52 movably supports the brake pad 14. The support outer surface 52B is contactable with the brake pad 16 in a state where the support body 52 movably supports the brake pad 16. The support outer surface 52B is made of the non-metallic material.

As seen in FIG. 7, the support body 52 includes a slit 52C. The slit 52C extends radially outwardly from the through-hole 52A to the support outer surface 52B. The slit 52C extends radially outwardly from the through-hole 52A to the support outer surface 52B with respect to the longitudinal axis A1. However, the slit 52C can be omitted from the support body 52. In such an embodiment, for example, the support body 52 can be attached to the axle body 50 using an insert molding.

The support body 52 includes a first circumferential end 52D and a second circumferential end 52E. The second circumferential end 52E is spaced apart from the first circumferential end 52D to define the slit 52C between the first circumferential end 52D and the second circumferential end 52E.

The slit 52C has a width W1 defined between the first circumferential end 52D and the second circumferential end 52E. The width W1 of the slit 52C is smaller than the second outer diameter DM2 of the second axle body 64 in an attachment state where the support body 52 is attached to the axle body 50. The width W1 includes a maximum width W11 and a minimum width W12. The maximum width W11 and the minimum width W12 are smaller than the second outer diameter DM2 of the second axle body 64 in the attachment state where the support body 52 is attached to the axle body 50. However, the width W1 can be equal to or larger than the second outer diameter DM2 of the second axle body 64 in the attachment state where the support body 52 is attached to the axle body 50 if needed and/or desired. At least one of the maximum width W11 and the minimum width W12 can be equal to or larger than the second outer diameter DM2 of the second axle body 64 in the attachment state where the support body 52 is attached to the axle body 50 if needed and/or desired.

The support body 52 is contactable with the brake pad 14 and/or 16 before the axle body 50 comes into contact with the brake pad 14 and/or 16. Specifically, a first minimum distance DS1 is defined between the longitudinal axis A1 and a line LN connecting a first radially outermost point P1 of the first circumferential end 52D and a second radially outermost point P2 of the second circumferential end 54D in the cross-section taken along a plane perpendicular to the longitudinal axis A1. A second minimum distance DS2 is defined between the longitudinal axis A1 and an outer peripheral surface 64A of the second axle body 64 in the cross-section taken along the plane perpendicular to the longitudinal axis A1. The first minimum distance DS1 is longer than the second minimum distance DS2. However, the first minimum distance DS1 can be equal to or shorter than the second minimum distance DS2 if needed and/or desired.

The support body 52 is deformable to allow the axle body 50 to pass from the support outer surface 52B to the through-hole 52A through the slit 52C when the support body 52 is attached to the axle body 50. The support body 52 is deformable to allow the axle body 50 to pass from the through-hole 52A to the support outer surface 52B through the slit 52C when the support body 52 is detached from the axle body 50. As seen in FIG. 4, the slit 52C extends along the longitudinal axis A1. The slit 52C extends from the first end 74 to the second end 76 of the support body 52 along the longitudinal axis A1. Thus, the support body 52 is attachable to and detachable from the axle body 50.

As seen in FIG. 6, the first axle body 62 includes a first tapered surface 62A. The third axle body 66 includes a second tapered surface 66A. The first tapered surface 62A is inclined relative to the longitudinal axis A1 from an outer peripheral surface of the first axle body 62 to an outer peripheral surface of the second axle body 64 to decrease an outer diameter of the first tapered surface 62A. The second tapered surface 66A is inclined relative to the longitudinal axis A1 from an outer peripheral surface of the third axle body 66 to the outer peripheral surface of the second axle body 64 to decrease an outer diameter of the second tapered surface 66A.

The first end 74 of the support body 52 is contactable with the first tapered surface 62A. The second end 76 of the support body 52 is contactable with the second tapered surface 66A. The first end 74 of the support body 52 includes a first inclined surface 74A contactable with the first tapered surface 62A. The second end 76 of the support body 52 includes a second inclined surface 76A contactable with the second tapered surface 66A.

The first inclined surface 74A is inclined relative to the longitudinal axis A1 from the support outer surface 52B to an inner peripheral surface of the through-hole 52A to decrease an inner diameter of the first inclined surface 74A. The second inclined surface 76A is inclined relative to the longitudinal axis A1 from the support outer surface 52B to the inner peripheral surface of the through-hole 52A to decrease an inner diameter of the second inclined surface 76A. The first inclined surface 74A is in contact with the first tapered surface 62A in a state where the support body 52 is attached to the axle body 50. The second inclined surface 76A is in contact with the second tapered surface 66A in the state where the support body 52 is attached to the axle body 50. However, at least one of the first inclined surface 74A and the second inclined surface 76A can be omitted from the support body 52 if needed and/or desired. At least one of the first tapered surface 62A and the second tapered surface 66A can be omitted from the axle body 50 if needed and/or desired.

The pad axle 18 can comprise a rotation restricting structure configured to restrict a relative rotation between the axle body 50 and the support body 52. In such a modified embodiment, for example, the rotation restricting structure includes a concavo-convex shape. The rotation restricting structure includes at least one concave portion and at least one convex portion which are configured to be engaged with each other to restrict the relative rotation between the axle body 50 and the support body 52. The at least one concave portion is provided to one of the axle body 50 and the support body 52. The at least one concave portion is provided to the other of the axle body 50 and the support body 52. The at least one concave portion can include the slit 52C in which the at least one convex portion is provided in a case where the at least one concave portion is provided to the support body 52. For example, the rotation restricting structure can be configured to position the support body 52 relative to the axle body 50 such that a depth direction (e.g., a direction of the first minimum distance DS1 illustrated in FIG. 7) of the slit 52C is provided along a rotational direction of the disc brake rotor 4.

Figure 8:
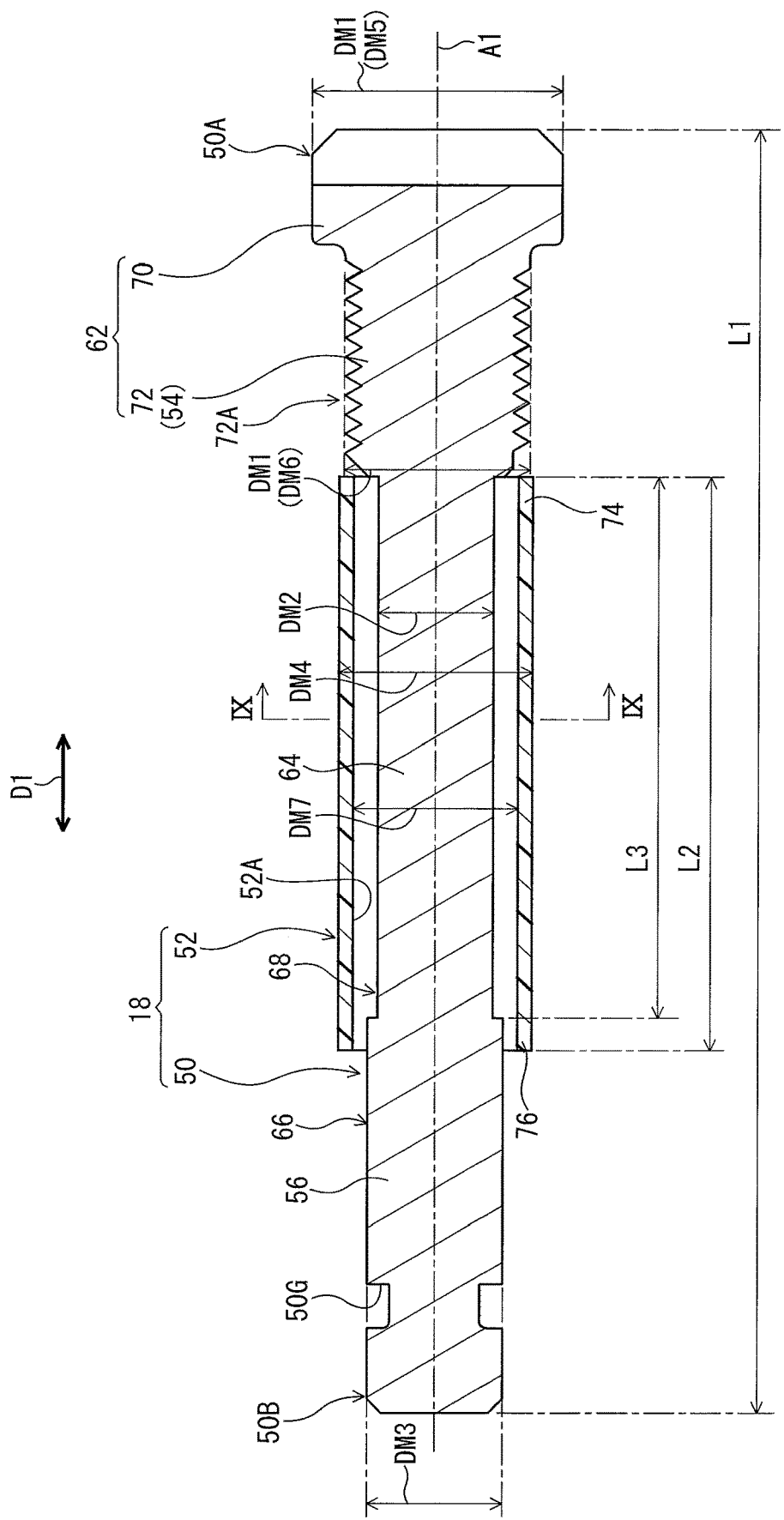
FIG. 8 is a cross-sectional view of the pad axle in accordance with a modification (before heat shrinkage of the support body).
Figure 9:
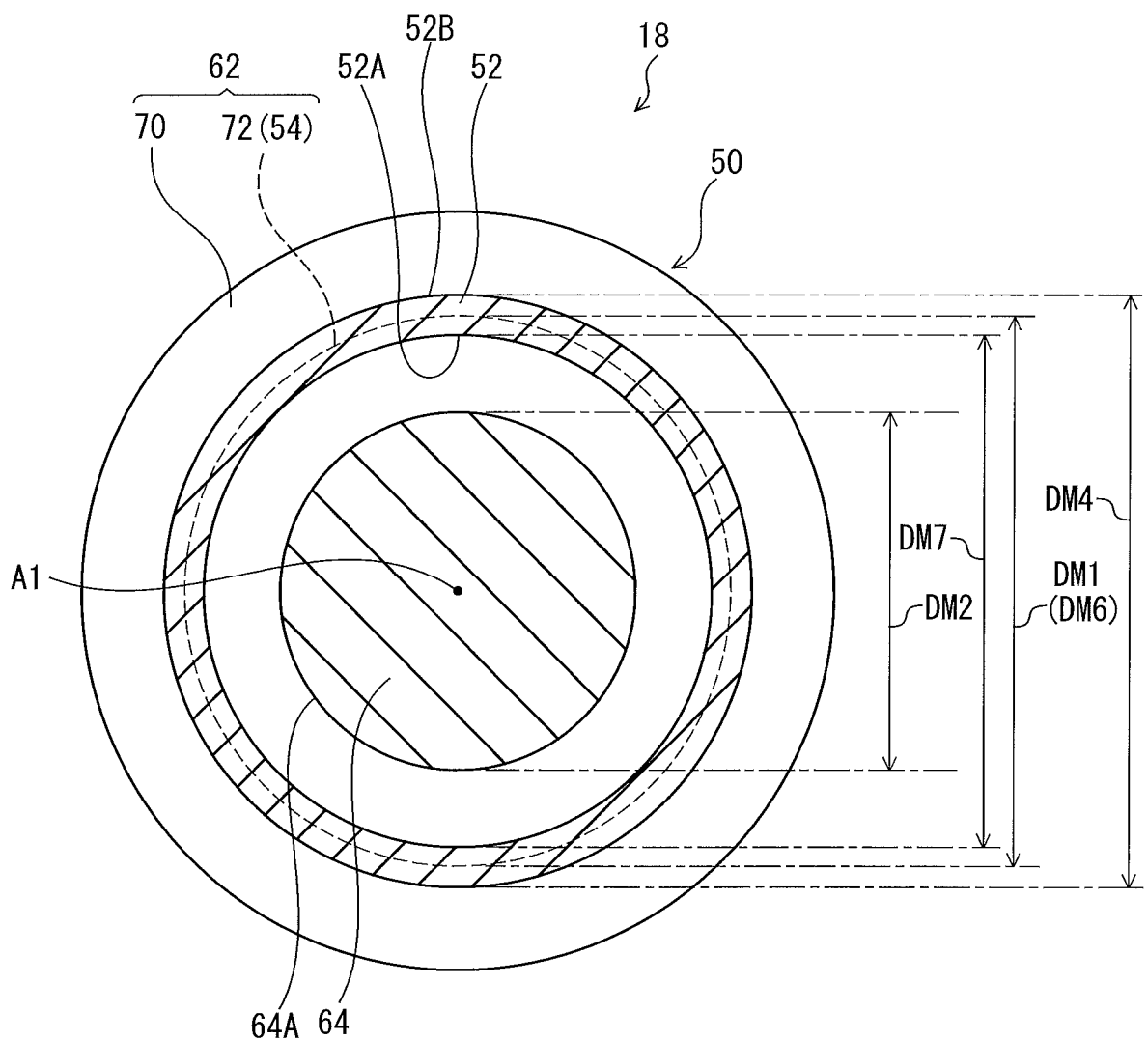
FIG. 9 is a cross-sectional view of the pad axle taken along line IX-IX of FIG. 8 (before heat shrinkage of the support body).
Figure 10:
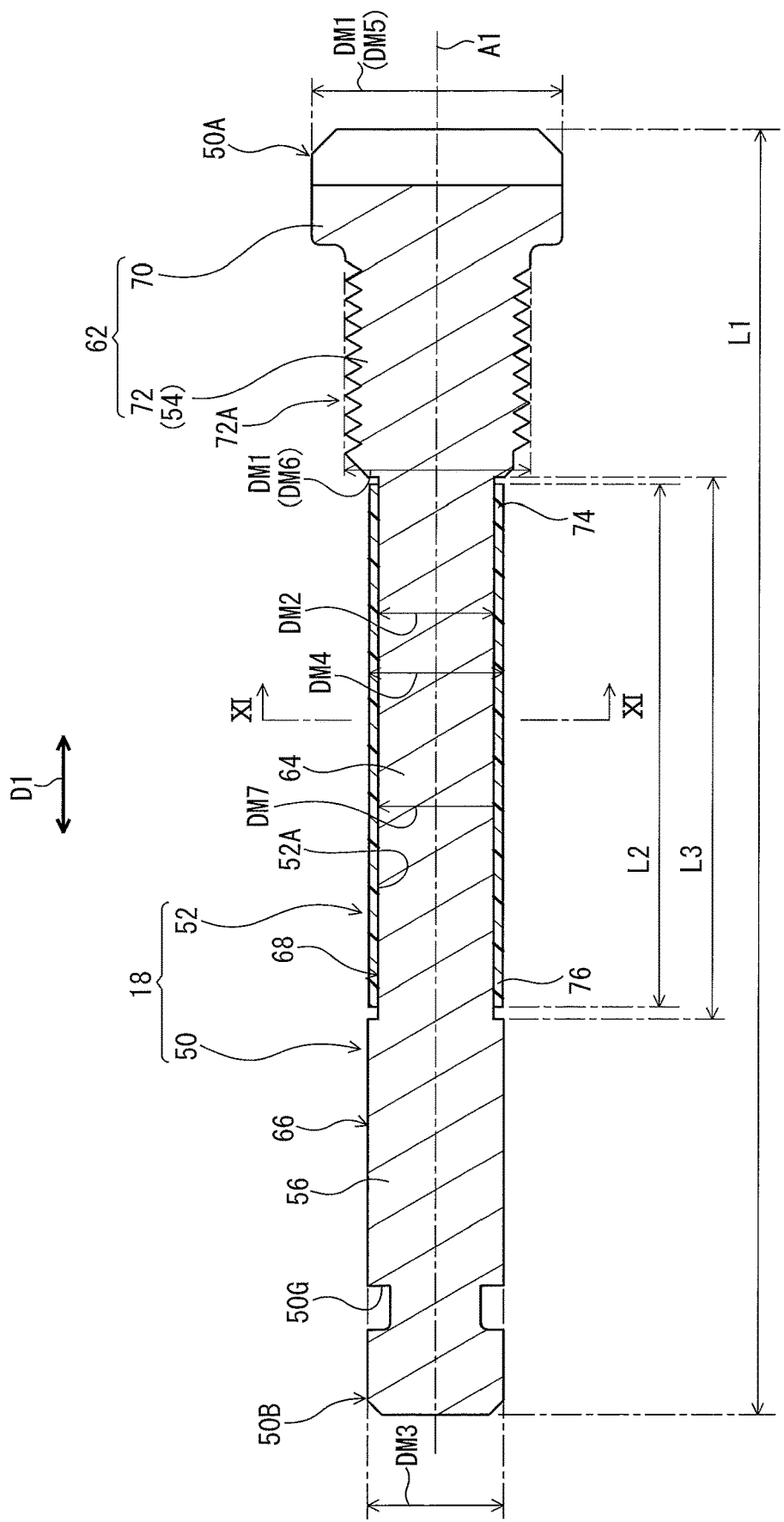
FIG. 10 is a cross-sectional view of the pad axle in accordance with the modification (after heat shrinkage of the support body).
Figure 11:
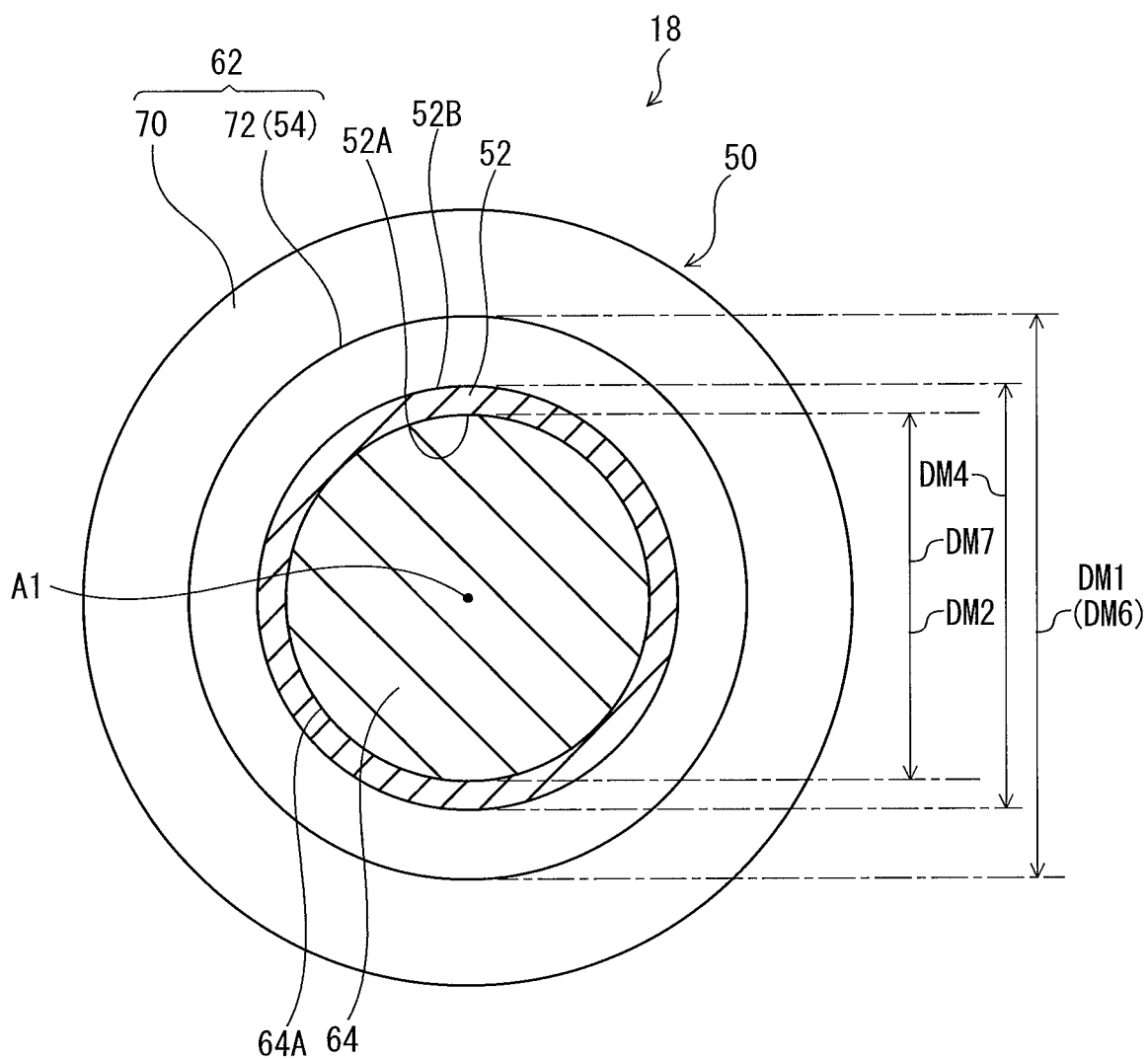
FIG. 11 is a cross-sectional view of the pad axle taken along line XI-XI of FIG. 10 (after heat shrinkage of the support body).

As seen in FIGS. 8 to 11, the support body 52 can be made of a heat-shrinkable material. FIGS. 8 and 9 show the axle body 50 and the support body 52 before heat shrinkage of the support body 52. FIGS. 10 and 11 show the axle body 50 and the support body 52 after heat shrinkage of the support body 52. The axle body 50 includes the third axle body 66 having the third outer diameter DM3. The support body 52 has an inner diameter DM7. The support body 52 has the support outer diameter DM4. The inner diameter DM7 of the support body 52 has a different size before and after heat shrinkage of the support body 52. The support outer diameter DM4 of the support body 52 has a different size before and after heat shrinkage of the support body 52.

As seen in FIGS. 8 and 9, the inner diameter DM7 of the support body 52 is larger than the third outer diameter DM3 before heat shrinkage of the support body 52. Thus, the third axle body 66 of the axle body 50 is inserted into the through-hole 52A of the support body 52 before heat shrinkage of the support body 52. However, the inner diameter DM7 of the support body 52 can be smaller than or equal to the third outer diameter DM3 before heat shrinkage of the support body 52 if needed and/or desired. In a case where the inner diameter DM7 is equal to the third outer diameter DM3 before heat shrinkage of the support body 52, the third axle body 66 deforms the support body 52 to enlarge the inner diameter DM7 when the third axle body 66 is inserted into the through-hole 52A of the support body 52 before heat shrinkage of the support body 52.

In the modification, the inner diameter DM7 of the support body 52 is smaller than the first outer diameter DM1 of the first axle body 62 before heat shrinkage of the support body 52. The inner diameter DM7 of the support body 52 is smaller than the axle outer diameter DM6 of the axle part 72 before heat shrinkage of the support body 52. However, the inner diameter DM7 of the support body 52 can be larger than or equal to the first outer diameter DM1 of the first axle body 62 before heat shrinkage of the support body 52 if needed and/or desired. The inner diameter DM7 of the support body 52 can be larger than or equal to the axle outer diameter DM6 of the axle part 72 before heat shrinkage of the support body 52 if needed and/or desired.

As seen in FIG. 8, the support body 52 has the second length L2. The attachment recess 68 has a third length L3 defined along the longitudinal axis A1. In the modification, the second length L2 is longer than the third length L3 of the attachment recess 68 before heat shrinkage of the support body 52. However, the second length L2 can be equal to or shorter than the third length L3 of the attachment recess 68 before heat shrinkage of the support body 52 if needed and/or desired.

As seen in FIGS. 10 and 11, the inner diameter DM7 of the support body 52 is smaller than the third outer diameter DM3 after heat shrinkage of the support body 52. The inner diameter DM7 of the support body 52 is equal to the second outer diameter DM2 of the second axle body 64 after heat shrinkage of the support body 52. The inner diameter DM7 of the support body 52 can be larger than the second outer diameter DM2 of the second axle body 64 after heat shrinkage of the support body 52 if needed and/or desired.

The support outer diameter DM4 is different from the third outer diameter DM3 after heat shrinkage of the support body 52. In the modification, the support outer diameter DM4 is smaller than the third outer diameter DM3 after heat shrinkage of the support body 52. However, the support outer diameter DM4 can be larger than or equal to the third outer diameter DM3 after heat shrinkage of the support body 52 if needed and/or desired.

As seen in FIG. 10, the second length L2 is shorter than the third length L3 of the attachment recess 68 after heat shrinkage of the support body 52. However, the second length L2 can be equal to the third length L3 of the attachment recess 68 after heat shrinkage of the support body 52 if needed and/or desired.

As seen in FIGS. 9 and 11, the support body 52 made of the heat-shrinkable material has a tubular shape. However, the support body 52 can include the slit 52C as with the embodiment depicted in FIG. 7 if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A pad axle for a brake caliper, comprising:
an axle body including a first mounting part and a second mounting part and extends along a longitudinal axis between the first mounting part and the second mounting part, both of the first mounting part and the second mounting part being configured to be coupled to a caliper body of the brake caliper; and
a support body being a different member from the axle body and attached to the axle body to movably support a brake pad of the brake caliper relative to both the support body and the caliper body, the support body being provided between the first mounting part and the second mounting part of the axle body, the support body being made of a non-metallic material, wherein the support body includes a through-hole, the axle body includes
a first axle body having a first outer diameter,
a second axle body having a second outer diameter, and
a third axle body having a third outer diameter,
the second outer diameter is smaller than the first outer diameter and the third outer diameter, and
the second axle body is provided between the first axle body and the third axle body to define an attachment recess between the first axle body and the third axle body.

2. The pad axle according to claim 1, wherein
the axle body is at least partially provided in the through-hole.

3. The pad axle according to claim 1, wherein
the first axle body includes a head part having a head outer diameter,
the first outer diameter includes the head outer diameter,
the head outer diameter is a maximum outer diameter in the pad axle,
the first mounting part includes an external thread coupled to an internal thread of the caliper body, and
the external thread is provided at a same longitudinal end portion of the axle body as the head part.

4. The pad axle according to claim 1, wherein
the support body is made of a resin material.

5. The pad axle according to claim 1, wherein
the axle body is made of a metallic material.

6. The pad axle according to claim 1, wherein
the support body includes a support outer surface contactable with the brake pad in a state where the support body movably supports the brake pad, and
the support outer surface is made of the non-metallic material.

7. The pad axle according to claim 2, wherein
the second axle body is at least partially provided in the through-hole of the support body.

8. The pad axle according to claim 7, wherein
the support body is at least partially provided in the attachment recess.

9. The pad axle according to claim 8, wherein
the first outer diameter is larger than the third outer diameter.

10. The pad axle according to claim 8, wherein
the support body has a support outer diameter larger than the second outer diameter.

11. The pad axle according to claim 10, wherein
the support outer diameter is smaller than the first outer diameter.

12. The pad axle according to claim 10, wherein
the support outer diameter is equal to the third outer diameter.

13. The pad axle according to claim 7, wherein
the first axle body includes a head part having a head outer diameter,
the first outer diameter includes the head outer diameter, and
the head outer diameter is a maximum outer diameter in the pad axle.

14. The pad axle according to claim 13, wherein
the first axle body includes an axle part having an axle outer diameter,
the first outer diameter includes the axle outer diameter, and
the axle outer diameter is smaller than the head outer diameter.

15. The pad axle according to claim 14, wherein
the axle part includes an external thread coupled to an internal thread of the caliper body.

16. The pad axle according to claim 7, wherein
the support body includes
a support outer surface, and
a slit extending radially outwardly from the through-hole to the support outer surface.

17. The pad axle according to claim 16, wherein
the support body is deformable to allow the axle body to pass from the support outer surface to the through-hole through the slit when the support body is attached to the axle body.

18. The pad axle according to claim 16, wherein
the support body is deformable to allow the axle body to pass from the through-hole to the support outer surface through the slit when the support body is detached from the axle body.

19. The pad axle according to claim 16, wherein
the support body includes a first circumferential end and a second circumferential end,
the second circumferential end is spaced apart from the first circumferential end to define the slit between the first circumferential end and the second circumferential end,
the slit has a width defined between the first circumferential end and the second circumferential end, and
the width of the slit is smaller than the second outer diameter of the second axle body in an attachment state where the support body is attached to the axle body.

20. The pad axle according to claim 7, wherein
the support body is made of a heat-shrinkable material,
the support body has an inner diameter, and
the inner diameter of the support body is larger than the third outer diameter before heat shrinkage of the support body.

21. The pad axle according to claim 20, wherein
the inner diameter of the support body is smaller than the third outer diameter after heat shrinkage of the support body.

22. The pad axle according to claim 20, wherein
the support body has a support outer diameter, and
the support outer diameter is different from the third outer diameter after heat shrinkage of the support body.

23. The pad axle according to claim 1, wherein
the support body is made of a heat-shrinkable material.

24. The pad axle according to claim 1, wherein
the axle body includes a first axle end and a second axle end and extends along the longitudinal axis between the first axle end and the second axle end, and
the support body is provided between the first axle end and the second axle end.

25. A brake caliper for a human-powered vehicle, comprising:
a caliper body;
a brake pad including a support hole; and
the pad axle according to claim 1, the pad axle being coupled to the caliper body, the pad axle extending through the support hole to movably support the brake pad relative to the caliper body.

26. A pad axle for a brake caliper, comprising:
an axle body configured to be coupled to a caliper body of the brake caliper; and
a support body attached to the axle body to movably support a brake pad of the brake caliper relative to both the support body and the caliper body, the support body being made of a non-metallic material, the support body including a through-hole, the axle body being at least partially provided in the through-hole, wherein the support body is made of a heat-shrinkable material, the axle body includes an attachment recess, the attachment recess has a length defined along a longitudinal axis of the pad axle, the support body is at least partially provided in the attachment recess, and the support body has a length defined along the longitudinal axis that is shorter than the length of the attachment recess after heat shrinkage of the support body such that a gap is formed between the support body and the attachment recess along the longitudinal axis.

27. A pad axle for a brake caliper, comprising:

an axle body including a first mounting part and a second mounting part and extends along a longitudinal axis between the first mounting part and the second mounting part, both of the first mounting part and the second mounting part being configured to be coupled to a caliper body of the brake caliper; and a support body being a different member from the axle body and attached to the axle body to movably support a brake pad of the brake caliper relative to the caliper body, the support body being provided between the first mounting part and the second mounting part of the axle body, the support body being made of a non-metallic material, wherein the support body includes
a through-hole,
a support outer surface, and
a slit extending radially outwardly from the through-hole to the support outer surface, and the support body includes a first circumferential end and a second circumferential end that are spaced apart when the support body is attached on the axle body to define the slit between the first circumferential end and the second circumferential end.

* * * * *